(No Model.)
F. E. GUY.
BICYCLE.
No. 578,921. Patented Mar. 16, 1897.
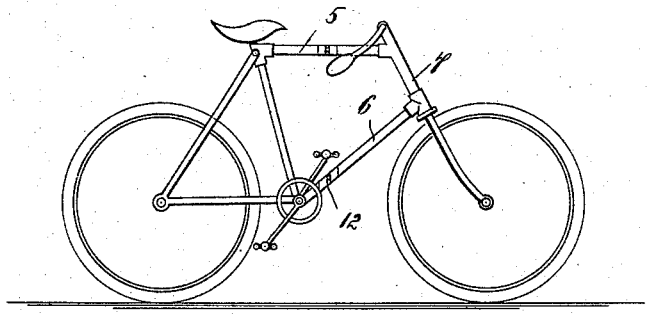
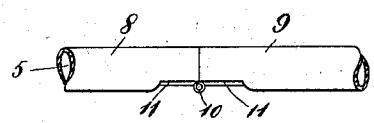
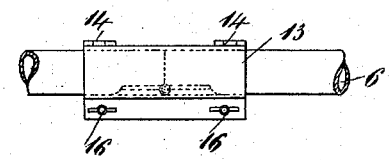
 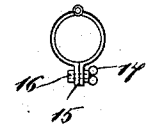
WITNESSES
John A Buckler,
C Gerit
INVENTOR
Fred E Guy
BY
Edgar Tate
ATTORNEYS

UNITED STATES PATENT OFFICE.

FRED E. GUY, OF NEW YORK, N. Y.

BICYCLE.

SPECIFICATION forming part of Letters Patent No. 578,921, dated March 16, 1897.

Application filed June 18, 1896. Serial No. 596,058. (No model.)

*To all whom it may concern:*

Be it known that I, FRED E. GUY, a citizen of the United States, and a resident of New York, in the county of New York and State of New York, have invented certain new and useful Improvements in Bicycles and Similar Vehicles, of which the following is a specification, reference being had to the accompanying drawings, forming a part thereof, in which similar numerals of reference indicate corresponding parts, wherever found throughout the several views.

This invention relates to bicycles and similar vehicles; and the object thereof is to provide a vehicle of this class the frame of which may be folded together, a further object being to provide a bicycle in which the front portion of the frame and the guide-wheel may be folded backward adjacent to the rear portion of the frame and the drive-wheel; and with these and other objects in view the invention consists in the construction, combination, and arrangement of parts hereinafter described and claimed.

The invention is fully disclosed in the following specification, of which the accompanying drawings form a part, in which—

Figure 1 is a side view of a bicycle the frame of which is made according to my invention; Fig. 2, a plan view of the upper horizontal rod of the frame; Fig. 3, a similar view showing a clamp which I employ connected therewith; Fig. 4, an end view of the upper horizontal rod, showing the separate parts thereof which are folded adjacent to each other; and Fig. 5, an end view of the clamp which I employ.

In the drawings forming part of this specification I have shown in Fig. 1 an ordinary bicycle, and in the practice of my invention I divide the upper horizontal rod 5 centrally thereof, and the rod 6, which extends from the support of the pedal-shaft upwardly and forwardly to the tubular head 7, is also divided in vertical line with the division of the rod 5. The abutting sections 8 and 9 of the rod 5 are hinged together at 10, and the sides of the ends of said sections to which the hinge is secured are provided with longitudinal cavities or recesses 11, whereby the outer portion of the hinge is made parallel with the sides of the main portions of the sections 8 and 9 of said rod or are countersunk. The rod 6 is similarly divided at 12 and hinged together in a similar manner, as shown in Fig. 3, and I also provide a tubular clamp 13, which consists of two separate similar parts hinged together at one side, as shown at 14, and the opposite sides are provided with outwardly-directed parallel plates 15, and in practice said clamps are connected with the rods 5 and 6 by means of bolts 16, which are passed through the side plates 15 and provided with nuts or burs 17.

The clamps 13 are free to slide on the rods 5 and 6, said clamps being tubular in form, and by reason of the manner in which the hinge is connected therewith said tubular clamps are free to slide over said hinges, as shown in Fig. 3.

In practice or when the vehicle is in use the clamps are slid over the hinges, as shown in said Fig. 3, and the frame is rigid, and the construction herein described does not interfere with the operation of the vehicle, but whenever it is desired to fold the separate parts thereof together all that is necessary is to loosen the screws or bolts 16 or the nuts or burs 17 thereon and slide said clamps along the rods 5 and 6 until they are clear of the hinge connection of the separate sections thereof, when the separate parts of the frame may be folded together as will be readily understood.

This improvement is of great advantage, especially in shipping vehicles of this class or in storing the same; and my improvement does not add materially to the cost of the vehicle, and it is evident that changes in and modifications of the construction herein described may be made without departing from the spirit of my invention or sacrificing its advantages.

Having fully described my invention, I claim as new and desire to secure by Letters Patent—

The combination with a bicycle-frame, connecting-bars of which are formed of hinged sections, the side of the bars adjacent to the hinged connection being flattened longitudinally forming cavities or recesses, whereby the outer portion of the hinge is flush with the surface of the section and a tubular clamp, the longitudinal sections of which are hinged at one side thereof, the free sides being provided with a longitudinal rib provided with clamping devices, substantially as described.

In testimony that I claim the foregoing as my invention I have signed my name, in presence of the subscribing witnesses, this 15th day of June, 1896.

FRED E. GUY.

Witnesses:
W. W. HILL,
L. M. MULLER.